United States Patent
Liu et al.

(10) Patent No.: US 11,219,080 B2
(45) Date of Patent: Jan. 4, 2022

(54) SELECTION OF NETWORK CONNECTION FOR CALL RETRY BASED ON NEIGHBOR INFORMATION IN SYSTEM INFORMATION BLOCKS

(71) Applicant: T-Mobile USA, Inc., Bellevue, WA (US)

(72) Inventors: Jun Liu, Issaquah, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/913,187

(22) Filed: Mar. 6, 2018

(65) Prior Publication Data

US 2019/0281648 A1  Sep. 12, 2019

(51) Int. Cl.
*H04W 4/00* (2018.01)
*H04W 76/19* (2018.01)
*H04W 88/06* (2009.01)
*H04W 84/04* (2009.01)
*H04W 84/12* (2009.01)
*H04W 88/08* (2009.01)

(52) U.S. Cl.
CPC .......... *H04W 76/19* (2018.02); *H04W 84/042* (2013.01); *H04W 84/12* (2013.01); *H04W 88/06* (2013.01); *H04W 88/08* (2013.01)

(58) Field of Classification Search
CPC .............................. H04W 76/19; H04W 88/06
See application file for complete search history.

(56) References Cited

U.S. PATENT DOCUMENTS

| | | | | |
|---|---|---|---|---|
| 9,204,373 B2* | 12/2015 | Arora | ..................... | H04W 48/14 |
| 10,405,249 B2* | 9/2019 | Dash | ..................... | H04W 48/16 |
| 2011/0014919 A1* | 1/2011 | Otte | .................. | H04W 36/0061 |
| | | | | 455/442 |
| 2012/0236828 A1* | 9/2012 | Hapsari | ............. | H04W 36/0061 |
| | | | | 370/331 |
| 2014/0099955 A1* | 4/2014 | Nukala | ................. | H04W 36/00 |
| | | | | 455/436 |
| 2014/0128074 A1* | 5/2014 | Vangala | ................ | H04W 36/22 |
| | | | | 455/436 |
| 2016/0366619 A1* | 12/2016 | Yang | ................. | H04W 36/0016 |

* cited by examiner

*Primary Examiner* — Bo Hui A Zhu
(74) *Attorney, Agent, or Firm* — Lee & Hayes, P.C.

(57) ABSTRACT

User equipment (UE) can select a connection type for a retry of a failed call based on system information blocks (SIBs) received from a serving base station of a first radio access layer of a telecommunication network. When the UE experiences a call setup failure of a call attempted through the serving base station of the first radio access layer, the UE can determine whether neighbor information within the SIBs includes information about a neighboring base station of a second radio access layer. If it does, the UE can select a retry connection type as a connection to the neighboring base station of the second radio access layer. If it does not, the UE can select the retry connection type as a connection to an alternate network. The UE can then retry the call through the selected retry connection type.

20 Claims, 5 Drawing Sheets

116

Neighbor Information
300

Intra LTE Neighboring Information
1. Neighbor LTE Base Station 1 Information
2. Neighbor LTE Base Station 2 Information
3. Neighbor LTE Base Station 3 Information
4. Neighbor LTE Base Station 4 Information
...

3G (CS) Neighboring Information
1. Neighbor 3G Base Station 1 Information
2. Neighbor 3G Base Station 2 Information
3. Neighbor 3G Base Station 3 Information
4. Neighbor 3G Base Station 4 Information
...

2G (CS) Neighboring Information
1. Neighbor 2G Base Station 1 Information
2. Neighbor 2G Base Station 2 Information
3. Neighbor 2G Base Station 3 Information
4. Neighbor 2G Base Station 4 Information
...

FIG. 3

SELECTION OF NETWORK CONNECTION FOR CALL RETRY BASED ON NEIGHBOR INFORMATION IN SYSTEM INFORMATION BLOCKS

BACKGROUND

Telecommunication providers operate telecommunication networks that can wirelessly provide voice and data services to user devices of their subscribers. User devices can also be referred to as user equipment (UE), and as such the terms "user device" and "UE" can be used interchangeably. Telecommunication networks can include one or more radio access layers based on different types of wireless access technologies. As new generations of radio access layers are developed and deployed, telecommunication providers often continue to operate older generations of radio access layers within their network. For example, a telecommunication provider can operate a telecommunication network with a fifth generation (5G) radio access layer, a Long Term Evolution (LTE) radio access layer, a 3G radio access layer, and/or any other future or previous generation of radio access layer.

The simultaneous operation of multiple radio access layers within a telecommunication network can allow older devices to continue to connect to the telecommunication network, as well as allow devices to switch between different radio access layers in certain situations. For example, if a call attempt by a UE on a newer radio access layer fails, the UE can fall back to an older radio access layer and retry the call on the older radio access layer.

Newer generations of radio access layers tend to use packet switching to handle voice calls, while some older generations of radio access layers use circuit switching for voice calls. Accordingly, in some situations a UE can attempt to place a call on a packet switched radio access layer, but then retry the call on an older circuit switched radio access layer if the initial call attempt fails.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 depicts an example of Neighbor Information that can be included within one or more system information blocks (SIBs) transmitted by a serving base station.

DETAILED DESCRIPTION

Introduction

Figure 1:
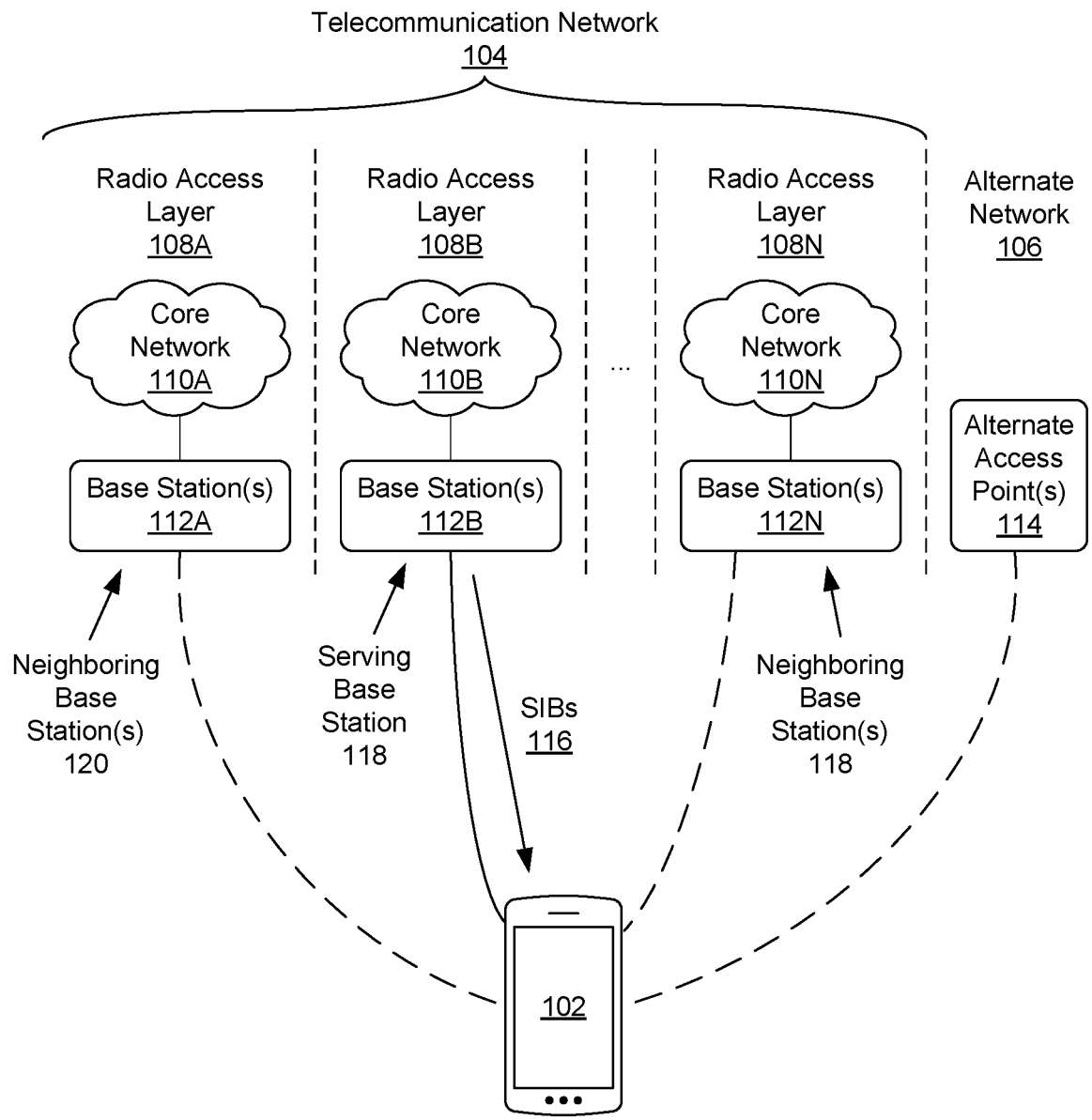
FIG. 1 depicts an exemplary environment in which user equipment (UE) can connect to a telecommunication network or an alternate network.

A telecommunication provider can operate a telecommunication network that includes multiple radio access layers based on different radio access technologies. Newer generations of radio access layers often handle voice calls in a packet switched (PS) domain, in which voice calls are transmitted using Voice over IP (VoIP) technology by sending audio data within Internet Protocol (IP) data packets. However, many older generations of radio access layers use a circuit-switched (CS) domain to transmit voice calls through dedicated circuits established between network nodes.

Operating multiple radio access layer generations within a telecommunication network can help maintain network access for older user equipment (UEs), and also provide fallback options for a UE that has trouble connecting to the telecommunication network through one radio access layer and wants to retry the connection through a different radio access layer. For example, a UE can attempt to place a call on a telecommunication network through a fifth generation (5G) radio access layer, but fall back to retrying the call over the telecommunication network's Long Term Evolution (LTE) radio access layer if the call fails over the 5G radio access layer. Similarly, a UE can attempt to place a voice call as a Voice over LTE (VoLTE) call or other type of packet-switched voice call over a PS domain radio access layer, but fall back to retrying the voice call over a CS domain of a 3G radio access layer or any other CS domain radio access layer.

Generally, UEs are programmed with a specific step-by-step fallback procedure based on a static hierarchy of a telecommunication network's radio access layers, that defines which radio access layers are to be used for call attempts and retries. For example, a UE on an LTE network can be programmed with a CS fallback procedure in which the UE is configured to first attempt a voice call as a VoLTE call in the PS domain through an LTE radio access layer, retry the voice call in the CS domain through a lower tier CS domain radio access layer if the LTE attempt fails, and then retry the voice call again over Wi-Fi or another provider's network if the CS domain attempt also fails. Unfortunately, this static approach of requiring the UE to retry a failed call on a specific lower tier radio access layer of the same telecommunication network can lead to long call setup times that are frustrating for users, especially when the call is an emergency call.

For example, a UE can register with a telecommunication network through a PS domain LTE radio access layer. As part of that registration, if the telecommunication provider also operates one or more radio access layers in the CS domain, the telecommunication network can perform a combined attach process to also register the UE on a lower tier CS domain without having the UE camp on the CS domain radio access layer. As such, the UE can be configured to retry a call on a lower tier CS domain radio access layer if the call fails on the PS domain LTE radio access layer, as the UE can trust network information indicating that the CS domain radio access layer exists. However, despite registering the UE on the lower tier CS domain, the telecommunication network may provide the UE with little to no information about base stations of that lower tier CS domain radio access network. For example, the UE may know what band of frequencies such base stations generally use, but not what specific frequencies or channels they use, or any other specific cell information. As such, if the UE needs to retry a call on the lower tier CS domain radio access layer, it may need to spend time performing a search by scanning frequencies to find an available base station of the lower tier CS domain radio access layer. This search can lead to long call setup times even if a base station of the lower tier CS domain radio access layer is found and the call retry through the lower tier CS domain radio access layer is successful.

Moreover, although the lower tier CS domain radio access layer may be generally available within the telecommunication network, a UE may not actually be covered by a base station of the lower tier CS domain radio access layer at a time at which it needs to retry a failed call. For example, a UE can be registered on both an LTE network and a CS domain through a combined attach process as described above. However, despite these registrations the UE may have LTE coverage inside a building through an LTE femtocell located inside the building, but not have CS domain coverage because signals of the CS domain radio access layer are blocked by the building's walls. In this scenario, if a voice call attempted through the LTE radio access layer fails, the UE would attempt to retry the call on the unavailable CS domain radio access layer because the telecommunication network registered the UE on both the LTE and CS domains. However, because the CS domain radio access layer is not actually available within the building, during the retry attempt the UE would waste time scanning for an available base station of the CS domain radio access layer before ultimately determining that it cannot find one. At that point, the UE might switch to retrying the voice call through a Wi-Fi access point or another provider's network.

Delays in call setup time, due to the time needed to search for a connection to a base station of a lower-tier radio access layer that may or may not actually be available to a UE for a retry at its current location, can be frustrating for users. Such call setup delays can be especially critical for emergency calls in which connecting the call as quickly as possible can be more important than which radio access layer, or even which network, the emergency call is connected through. For instance, a user who calls 911 in an emergency situation may want to establish a call with emergency services as quickly as possible, even though the quickest option may be to establish the call through an older radio access layer that offers lower voice quality than newer radio access layers.

This disclosure describes systems and processes through which call setup delays can be shortened when an initial call attempt fails and must be retried, by allowing UEs to determine from neighbor information associated with a serving base station whether a base station of a lower radio access layer is expected to be available at the UE's current location. If the neighbor information indicates that a base station of a lower radio access layer is expected to be available at the UE's location, the UE can retry the call through that base station. However, if the neighbor information indicates that no base station of the lower tier radio access layer is expected to be available at the UE's location, the UE can skip searching for a base station of that lower tier radio access layer and go straight to retrying the call through an alternate connection, such as a Wi-Fi connection or a roaming connection to another provider's network. Although it may take time to set up the alternate connection and/or use it to retry the call, the UE can still save time and thereby improve the call setup time overall by skipping the search for a base station of the lower tier radio access layer that will likely be unsuccessful.

In some cases, the systems and processes described herein can be used by a UE to override fallback procedures defined by the telecommunication network. For example, although a telecommunication network can define the static VoLTE fallback procedure described above, in which failed VoLTE calls are always retried on a lower tier CS domain radio access layer, a UE can instead use neighbor information as described herein to skip that retry on the lower CS domain radio access layer if the neighbor information does not include information about a base station of that lower CS domain radio access layer.

For instance, in the example described above in which a UE has LTE coverage via an LTE femtocell inside a building but does not have CS domain coverage due to outside signals being blocked by the building's walls, during installation of the femtocell a site survey may have discovered that CS domain signals are blocked at the femtocell's location. The femtocell can accordingly be configured not to include neighbor information about CS domain base stations. As such, even if the UE was also registered on the CS domain through a combined attach process and would normally use standard fallback procedures to retry failed LTE calls on the CS domain, the UE can recognize that the neighbor information received from the femtocell does not include CS domain information and accordingly keep retrying the call on the LTE radio access layer or skip to retrying the call through Wi-Fi or another type of connection.

Example Environment

FIG. 1 depicts an exemplary environment in which user equipment (UE) 102 can connect to a telecommunication network 104 or an alternate network 106 to make or receive calls, transmit or receive data, and/or perform any other network operation. A UE 102 can be any device that can wirelessly connect to the telecommunication network 104 or alternate network 106. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device. An example UE 102 is illustrated in greater detail in FIG. 4, and is described in detail below with reference to that figure.

A telecommunication network 104 can include multiple radio access layers 108. The radio access layers 108 can be based on different wireless access technologies, such as fifth generation (5G) technologies, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation of wireless access technology. In some situations, different radio access layers 108 operated by the same telecommunications provider can be considered to be different telecommunications networks 104 operated by that telecommunications provider.

Some radio access layers 108 can handle voice calls in a packet switched (PS) domain. In a PS domain, voice calls can be connected using Voice over IP (VoIP) technology in which audio data is transmitted via Internet Protocol (IP) data packets. For example, 5G networks, LTE networks, and some other 4G networks can be in the PS domain for voice calls. Video calls and other data transmissions can also be transmitted through radio access layers 108 using IP data packets.

Other radio access layers 108 can handle voice calls in a circuit switched (CS) domain. In a CS domain, voice calls can be connected through dedicated circuits established between network nodes. For example, some HSPA networks, GSM networks, and some other 2G, 3G and/or 4G networks can be in the CS domain for voice calls. While such radio access layers 108 can handle voice calls in a CS domain, some of them can handle video calls and other data transmissions in a PS domain using IP data packets. Additionally, some radio access layers 108 can have both PS domain and CS domain capabilities, such that they can handle voice calls either in a PS domain or a CS domain.

Each radio access layer 108 can include a core network 110 comprising network nodes that can set up and manage calls and other communications through the radio access layer 108. The core network 110 of a radio access layer 108 can be connected to base stations 112 of that radio access layer 108, and a UE 102 can reach the core network 110 via a connection to one of those base stations 112. In some examples, the core network 110 can also be connected to other networks and/or entities, such as an IP Multimedia Subsystem (IMS) or the Internet.

Aside from the radio access layers 108 of the telecommunication network 104, a UE 102 can also connect to one or more alternate networks 106 through an alternate access point 114. Alternate networks 106 can include Wi-Fi networks and networks operated by other carriers or providers. Accordingly, an alternate access point 114 can be a Wi-Fi access point, a base station of another provider's network, or any other type of network access point.

Figure 2:
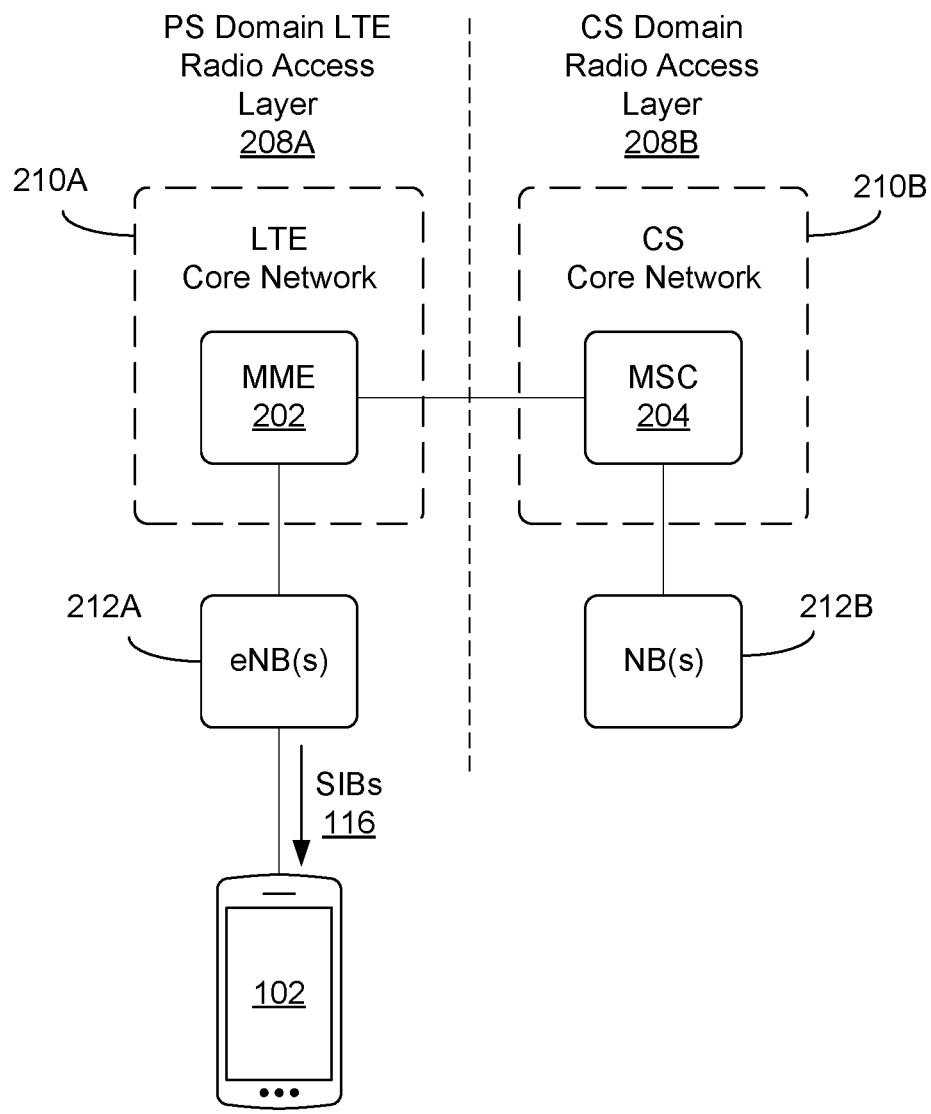
FIG. 2 depicts an example of elements in a packet switched (PS) LTE network and a circuit switched (CS) network that are operated as different radio access layers of a telecommunication network.

As noted above, different radio access layers 108 can be based on different wireless access technologies. By way of a non-limiting example, FIG. 2 depicts elements of a PS domain LTE radio access layer 208A and a CS domain radio access layer 208B that are operated as different radio access layers 108 of a telecommunication network 104 by a telecommunications provider.

An LTE core network 210A of a PS domain LTE radio access layer 208A can include a Mobility Management Entity (MME) 202, as well as other nodes such as Serving Gateways (S-GWs) and Packet Data Network (PDN) Gateways (P-GWs) (not pictured). The MME 202 can be a control node that can set up and manage default and dedicated bearers, authenticate subscribers in conjunction with a Home Subscriber Server (HSS), choose an S-GW for a UE 102, and/or perform other functions. The LTE core network 210A can be connected, through P-GWs, to an IMS, the Internet, and/or or any other IP-based network (not pictured). In a PS domain LTE radio access layer 208A, base stations 112 can be eNode Bs (eNBs) 212A, as shown in FIG. 2.

A CS domain radio access layer 208B can also include nodes of a CS core network 210B and base stations 212B through which a UE 102 can connect to the CS core network 210B. For example, the CS core network 210B of a CS domain radio access layer 208B can include a Mobile Switching Center (MSC) 204 that can manage and route voice calls by setting up circuits for end-to-end connections. In a CS domain radio access layer 208B, base stations 112 can be Node Bs (NBs) 212B or other types of base stations, as shown in FIG. 2.

In some examples, a core network 110 can be linked to other networks or entities that can assist the core network 110 in providing services. For example, in FIG. 2 an LTE core network 210A can be linked, through a P-GW, to an IMS that assists the LTE core network 210A with setting up and managing sessions for voice calls or other communications. In this example, a UE 102 can send a Session Initiation Protocol (SIP) message through the LTE core network 210A to the IMS that requests that a session be created for a new voice call. Based on that SIP message, the IMS can instruct the MME 202 and/or other elements of the core network 110 to set up dedicated bearers and/or other resources for the voice call.

In some examples, different radio access layers 108 can be connected within a telecommunication network 104, such that they can share information about a UE 102. In the example of FIG. 2, when a UE 102 connects to an eNB 212A of the PS domain LTE radio access layer 208A and becomes registered on the PS domain LTE radio access layer 208A with the MME 202, the MME 202 can use a combined attach process to share the UE's information with the MSC 204 of the CS domain radio access layer 208B and thereby register the UE 102 on the CS domain radio access layer 208B. Accordingly, registration of the UE 102 on the PS domain LTE radio access layer 208A can also register the UE 102 on the CS domain radio access layer 208B. Although after registration the UE 102 may camp on a base station 212A of the PS domain LTE radio access layer 208A and not a base station 212B of the CS radio access layer 212B, the combined attach process may allow the UE 102 to retry a voice call through the CS domain radio access layer 208B if it cannot successfully place the voice call on the PS domain LTE radio access layer 208A.

Although the UE 102 may be registered on both a first radio access layer 108 after a connection to a serving base station 112 of that first radio access layer, and also be registered on a second radio access layer 108 as described above, in some examples the telecommunication network 104 may provide the UE 102 with little to no information about base stations 112 of the second radio access layer 108. Accordingly, without the systems and methods described herein, if the UE 102 attempts retrying a failed call on the second radio access layer 108, it may need to perform a search by scanning many possible frequencies and/or channels for available base stations 112 of the second radio access layer 108.

Returning to FIG. 1, when a UE 102 connects to a particular base station 112 of a radio access layer 108, that base station 112 can become a serving base station 118 for the UE 102. Other base stations 112, of the same radio access layer 108 or one or more different radio access layers 108, can be considered neighboring base stations 120 of the serving base station 118.

The UE 102 can receive System Information Blocks (SIBs) 116 from the serving base station 118. A serving base station 118, such as an eNB of an LTE network, an NB of a CS domain network, or a base station 112 of a 5G network (sometimes referred to as a "gNB"), can transmit system information that can be received by UEs 102. System information can include a Master Information Block (MIB) and SIBs 116 that describe attributes of the telecommunication network 104, the serving base station 118, neighboring base stations 120 of the same and/or different radio access layers 108, and/or any other information.

FIG. 3 depicts an example of Neighbor Information 300 that can be included within one or more SIBs 116 transmitted by a serving base station 118. Neighbor Information 300 in a serving base station's SIBs 116 can include information about other neighboring base stations 120 that also offer network access to locations proximate to the serving base station 118, through the same or different radio access layers 108. For each neighboring base station 120, Neighbor Information 300 can include a cell identifier of the neighboring base station 120, an indication of which radio access layer 108 the neighboring base station 120 is associated with, information about frequencies and/or channels used by the neighboring base station 120, and/or any other information about the neighboring base station 120. For example, the Neighbor Information 300 shown in FIG. 3 may have been sent by an eNB 212A of a PS domain LTE radio access layer 208A that is acting as a serving base station 118, such that it includes information about other LTE eNBs 212A that are neighboring base stations 120 of the serving base station 118, as well as information about neighboring base stations 120 of one or more CS domain radio access layers 208B, such as 3G and 4G radio access layers 108, and/or any other radio access layer 108.

In some examples, elements of Neighbor Information 300 can be included in multiple SIBs 116, such that a UE 102 can assemble full Neighbor Information 300 from multiple SIBs 116 it receives from a serving base station 118. In some embodiments, a serving base station 118 can broadcast multiple SIBs 116 of different types identified as SIB1, SIB2, . . . , SIBm, and Neighbor Information 300 can be included in one or more of those multiple SIBs 116. By way of a non-limiting example, in some SIB numbering schemes an LTE eNB 212A acting as a serving base station 118 can include information about intra-frequency neighboring LTE base stations 120 in SIB4, information about inter-frequency neighboring LTE base stations 120 in SIB5, and information about neighboring base stations 120 of other CS domain radio access layers 208B in SIB6, SIB7, and/or SIB8. In other examples, a serving base station 118 can transmit Neighbor Information 300 in any other combination of SIBs 116, or in a single SIB 116.

Serving base stations 118 generally include Neighbor Information 300 in one or more SIBs 116 to assist UEs 102 during handovers of a successfully connected call from one base station 112 to another base station 112. However, as described herein, in the event of a failed call attempt on one radio access layer 108, a UE 102 can use Neighbor Information 300 it has received from its serving base station 118 to determine whether or not a neighboring base station 120 of another radio access layer 108 is likely to be available for a retry of the call.

As one example, a UE 102 can attempt to place a voice call through a serving base station 118 of a PS domain LTE radio access layer 208A by sending a SIP message to an IMS through the serving base station 118 and the LTE core network 210A of the PS domain LTE radio access layer 208A. Normally, the IMS can receive such a SIP message and instruct the LTE core network 210A of the PS domain LTE radio access layer 208A to set up dedicated bearers and/or other resources for the voice call. However, if the IMS is unavailable or cannot process the SIP message, because it is congested, offline, or for any other reason, the attempted call can fail.

Although in this situation the UE 102 could retry the call through another base station 212A of the PS domain LTE radio access layer 208A, the call would likely fail again due to the unavailability of the IMS. Retrying the call on a different radio access layer 108, such as one that handles voice calls in a CS domain and does not set up calls using the unavailable IMS, may be more successful. However, as noted above, the UE 102 may not actually be covered by the different radio access layer 108 when a call fails. Accordingly, the UE 102 can determine that it should attempt to retry a failed call on a different radio access layer 108 if Neighbor Information 300 includes information about a neighboring base station 120 of the different radio access layer 108, or determine that it should go directly to retrying the call on an alternate network 106 if the Neighbor Information 300 does not include information about a neighboring base station 120 of a different radio access layer 108.

In the first situation, in which a call fails on one radio access layer 108 but Neighbor Information 300 includes information about a neighboring base station 120 of a different radio access layer 108, a UE 102 can connect to the neighboring base station 120 on the different radio access layer 108 and retry the call through the neighboring base station 120. In some examples, the UE 102 can use information about the neighboring base station 120 in the Neighbor Information 300, such as its cell identifier, information about the frequencies and/or channels it uses, and/or any other information about the neighboring base station 120, to directly find and/or connect to the neighboring base station 120 rather than taking time to scan for any available base station 112 in the different radio access layer 108. Accordingly, the UE 102 can save time by directly connecting to a neighboring base station 120 of a different radio access layer 108 identified in the Neighbor Information 300 and retrying the call through that neighboring base station 120.

In some examples, a UE 102 can retry a failed call through a neighboring base station 120 of a different radio access layer 108 that is identified in Neighbor Information 300 even if the UE 102 has not been previously registered with that different radio access layer 108. Accordingly, in some examples the telecommunication network 104 can save time and/or resources by avoiding combined attach processes that register UEs 102 on other radio access layers 108, as described above with respect to FIG. 2. As another example, a UE 102 can use Neighbor Information 300 to retry a call that failed on a 5G radio access layer 108 on a PS domainLTE radio access layer 208A or other earlier generation of radio access layer 108, even though some 5G radio access layers 108 may not be backwards compatible with previous radio access layers 108 and as such do not use combined attach procedures to register UEs 102 with other radio access layers 108. Accordingly, using the Neighbor Information 300 as described herein can provide a fallback procedure for UEs 102 registered solely with 5G radio access layers 108, when 5G serving base stations 118 provide Neighbor Information 300 with information about neighboring base stations 120 of other radio access layers 108.

In the second situation, in which a call fails on one radio access layer 108 and Neighbor Information 300 is empty or otherwise does not include information about a neighboring base station 120 of a different radio access layer 108, a UE 102 can determine that finding a connection to a base station 112 of the different radio access layer 108 is unlikely. Based on this determination, the UE 102 can choose to retry the call on the original radio access layer 108 and/or skip retry attempts on the different radio access layer 108.

In some examples in which a UE 102 determines from Neighbor Information 300 that retrying a failed call on a different radio access layer 108 is unlikely to succeed, the UE 102 can retry the call on the original radio access layer 108 one or more times. For instance, if a first call attempt failed but the network did not return an error message indicating a problem with the original radio access layer 108, the UE 102 may choose to retry the call on the original radio access layer 108 rather than moving to the different radio access layer 108 to retry the call. A UE 102 may also choose to retry the call on the original radio access layer 108 if it determines that a call retry on an alternate network 106 is also unlikely to succeed.

In other examples, a UE 102 can be set to retry a failed call attempted on one radio access layer 108 on a different radio access layer 108. However, when a UE 102 determines from Neighbor Information 300 that retrying the call on the different radio access layer 108 is unlikely to succeed, the UE 102 can skip attempts to find and/or connect to a base station 112 of the different radio access layer 108 and instead go straight to attempting to find a connection to an alternate network 106 through which it can retry the call. For instance, when a UE 102 is connected to a PS domain LTE radio access layer 208A through an LTE femtocell inside a building, but Neighbor Information 300 in SIBs 116 received from the LTE femtocell does not include information about any neighboring base stations 120 of a CS domain radio access layer 208B, the UE 102 can skip searching for a base station 212B of the CS domain radio access layer 208B and go directly to retrying the call via Wi-Fi calling or some other alternate network 106. Skipping the search for a base station 112 of a different radio access layer 108 when the Neighbor Information 300 indicates that one is not present nearby can shorten the overall call setup time between the initial failed attempt and a successful retry on an alternate network 106.

In some examples, a UE 102 can use Neighbor Information 300 to determine whether to retry failed non-voice communications on different radio access layers 108 or on an alternate network 106. For example, a UE 102 can attempt to set up a video call or transfer data over a 5G radio access layer 108. If the video call or data transfer fails over the 5G radio access layer 108, the UE 102 can fall back to retrying the video call or data transfer over a PS domain LTE radio access layer 208A if Neighbor Information 300 received from a serving base station 118 of the 5G radio access layer 108 includes information about a neighboring base station 120 of the PS domain LTE radio access layer 208A, or go instead to retrying the voice call or data transfer via a Wi-Fi connection or other alternate network 106 if the Neighbor Information 300 does not include information about a neighboring base station 120 of the PS domain LTE radio access layer 208A or other radio access layer 108 that could be used for voice calls or data transfers.

Example Architecture

Figure 4:
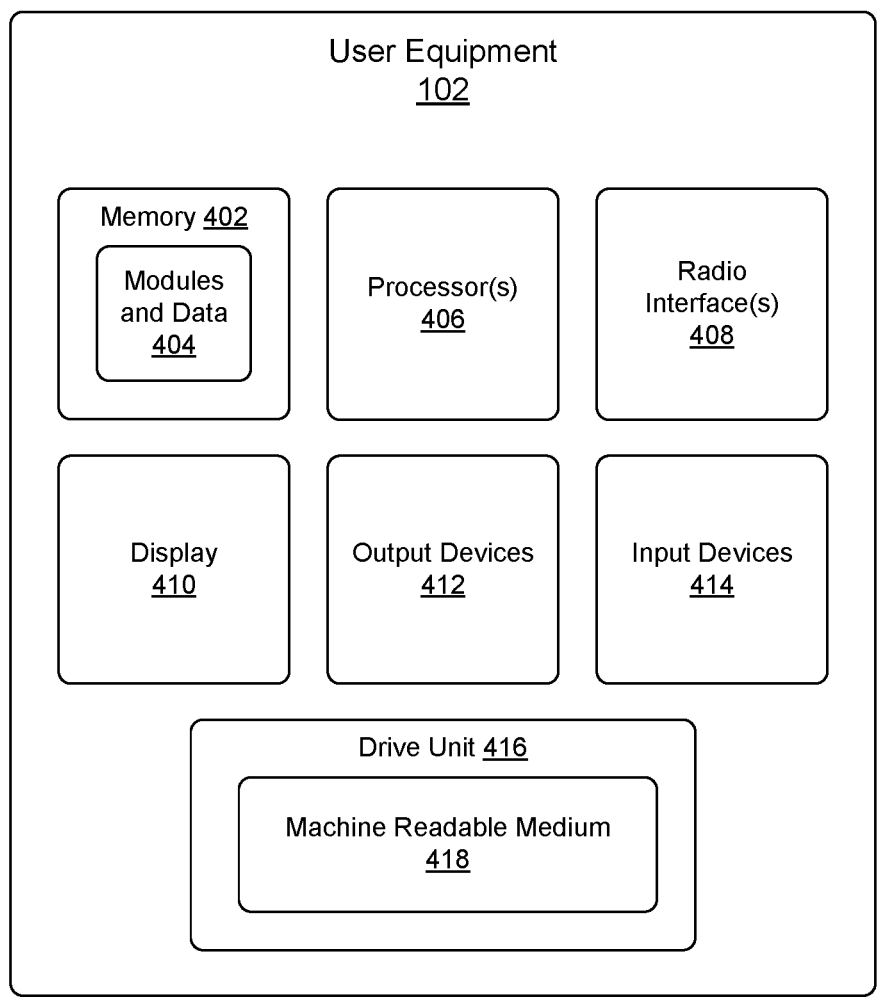
FIG. 4 depicts an example system architecture for a UE.

FIG. 4 depicts an example system architecture for a UE 102, in accordance with various examples. As shown, a UE 102 can include a memory 402 that stores modules and data 404, processor(s) 406, radio interfaces 408, a display 410, output devices 412, input devices 414, and/or a drive unit 416 including a machine readable medium 418.

In various examples, memory 402 can include system memory, which may be volatile (such as RAM), non-volatile (such as ROM, flash memory, etc.) or some combination of the two. Memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

In some examples memory 402 can also include a SIM (subscriber identity module) card, which is a removable memory card used to identify a user of the UE 102 to a telecommunication network 104.

The modules and data 404 can be utilized by the UE 102 to perform or enable performing any action taken by the UE 102. The modules and data 404 can include a UE platform and applications, and data utilized by the platform and applications.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with common types of volatile (RAM) and/or nonvolatile (ROM) memory.

The radio interfaces 408 can include transceivers, modems, interfaces, antennas, and/or other components that perform or assist in exchanging radio frequency (RF) communications with a base station 112 or alternate access point 114. For example, a UE 102 can have one or more radio interfaces 408 that are compatible with the base stations 112 of one or more radio access layers 108 and/or one or more alternate networks 106, such as one or more antennas configured to connect to a PS domain LTE radio access layer 208A, one or more antennas configured to connect to a lower tier CS domain radio access layer 208B, and one or more antennas configured to connect to a Wi-Fi access point. In other examples a processor 406, other modules and data 404, and/or other components of the UE 102 can perform or assist in transmitting and/or receiving data, and/or pre-processing or post-processing of such data.

The display 410 can be a liquid crystal display or any other type of display commonly used in UEs 102. For example, display 410 may be a touch-sensitive display screen, and can then also act as an input device or keypad, such as for providing a soft-key keyboard, navigation buttons, or any other type of input.

The output devices 412 can include any sort of output devices known in the art, such as a display 410, speakers, a vibrating mechanism, and/or a tactile feedback mechanism. Output devices 412 can also include ports for one or more peripheral devices, such as headphones, peripheral speakers, and/or a peripheral display.

The input devices 414 can include any sort of input devices known in the art. For example, input devices 414 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 418 can store one or more sets of instructions, such as software or firmware, that embodies any one or more of the methodologies or functions described herein. The instructions can also reside, completely or at least partially, within the memory 402, processor(s) 406, and/or radio interface(s) 408 during execution thereof by the UE 102. The memory 402 and the processor(s) 406 also can constitute machine readable media 418.

Example Operations

Figure 5:
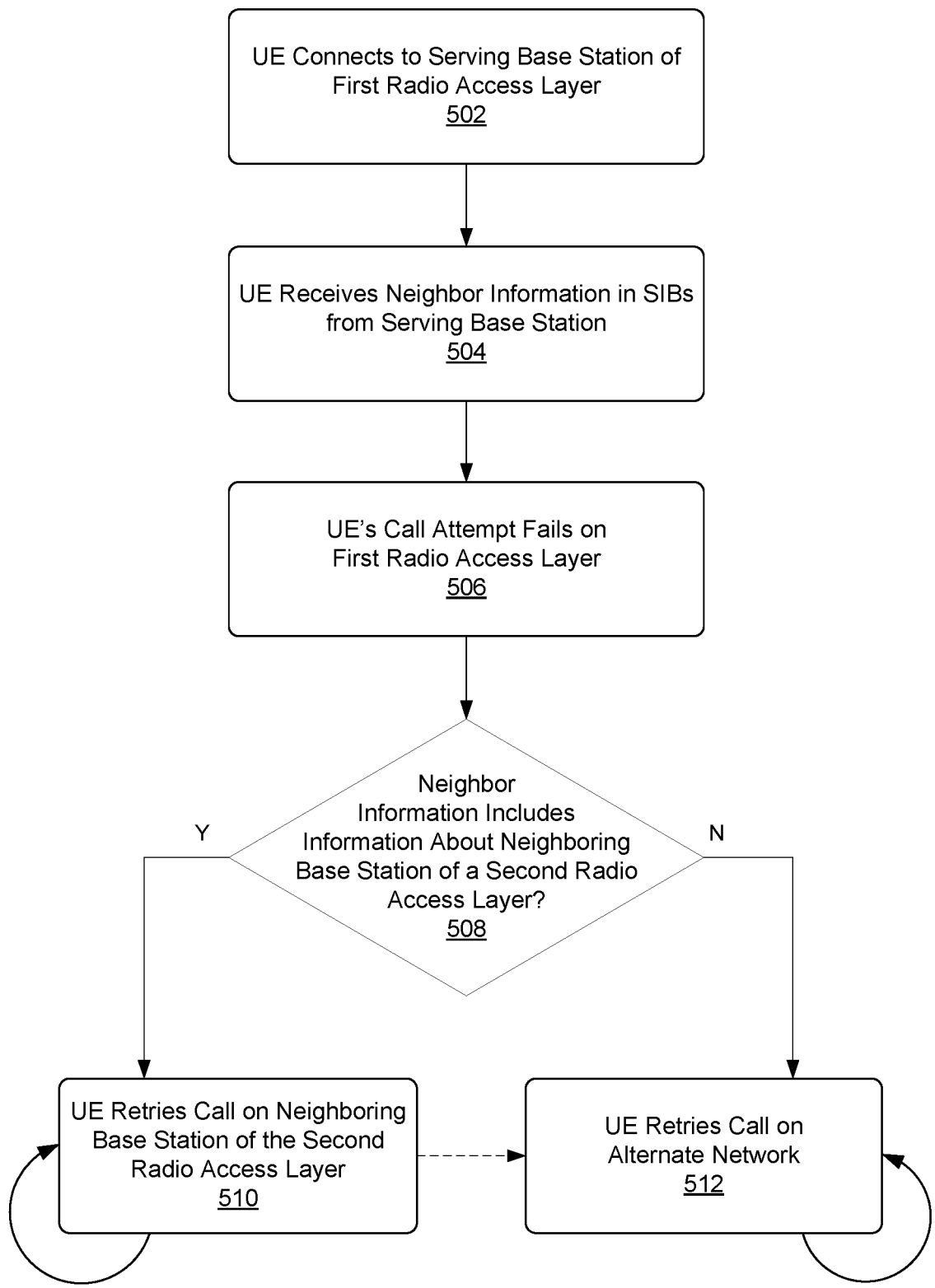
FIG. 5 depicts a flow chart of an exemplary process through which a UE can use Neighbor Information to determine a network connection to use when retrying a failed call.

FIG. 5 depicts a flow chart of an exemplary process through which a UE 102 can use Neighbor Information 300 to select a network connection to use when retrying a failed call. For example, a UE 102 can use the process of FIG. 5 to determine whether it should retry a call attempt that failed on a first radio access layer 108 of a telecommunication network 104 though a second radio access layer 102 of the same telecommunication network 104, or go straight to retrying the call attempt on an alternate network 106.

At block 502, the UE 102 can connect to a base station 112 of a first radio access layer 108 of the telecommunication network 104. In some situations, the first radio access layer 108 can be the most advanced radio access layer 108 offered in the telecommunication network 104 with which the UE 102 is compatible, such as a 5G radio access layer 108 or an LTE-A radio access layer 108. Upon connection to the base station 112 of the first radio access layer 108, the base station 112 of the first radio access layer 108 can become a serving base station 118 for the UE's connection to the telecommunication network 104.

At block 504, the UE 102 can receive one or more SIBs 116 from the serving base station 118. The UE 102 can identify Neighbor Information 300 within one of more of the SIBs 116. As described above, Neighbor Information 300 transmitted in SIBs 116 by a serving base station 118 can include information about neighboring base stations 120 of the same radio access layer 108, if any, and/or information about neighboring base stations 120 of different radio access layers 108, if any.

At block 506, a call attempted by the UE 102 through the serving base station 118 of the first radio access layer 108 can fail. For example, when the first radio access layer 108 is a PS domain LTE radio access layer 208A, the UE 102 can send a SIP request through the serving base station 118 and the LTE core network 210A of the PS domain LTE radio access layer 208A to an IMS. However, the call attempt can fail if the IMS is unavailable or otherwise cannot process the UE's SIP request.

At block 508, the UE 102 can determine if the Neighbor Information 300 sent in SIBs 116 by the serving base station 118 of the first radio access layer 108 includes information about a neighboring base station 120 of a second radio access layer 108 of the same telecommunication network 104. In some examples, the first radio access layer 108 can be in a PS domain for voice calls while the second radio access layer 108 can be in a CS domain for voice calls, such as if the first radio access layer 108 is a PS domain LTE radio access layer 208A and the second radio access layer 108 is a CS domain radio access layer 208B. In other examples, the first and second radio access layers 108 can both be in a PS domain or a CS domain for voice calls, such as if the first radio access layer 108 is a PS domain 5G radio access layer 108 and the second radio access layer 108 is a PS domain LTE radio access layer 208A.

Based on UE's determination at block 508, if the Neighbor Information 300 includes information about a neighboring base station 120 of a second radio access layer 108, the UE 102 can move to block 510. However, if the Neighbor Information 300 does not include information about a neighboring base station 120 of a second radio access layer 108, the UE 102 can move to block 512.

At block 510, the UE 102 can retry the call through the neighboring base station 120 of the second radio access layer 108. In some examples, the UE 102 can use information about the neighboring base station 120 that was included in the Neighbor Information 300, such as its cell identifier or frequency or channel information, to directly connect to the neighboring base station 120, rather than spending time searching for an available base station 112 of the second radio access layer 108. Although the call retry may be likely to succeed on the second radio access layer 108 because the Neighbor Information 300 indicates that the neighboring base station 120 is present, if for any reason the call retry also fails on the second radio access layer 108, the UE 102 can move to block 512. In some examples, if a call retry fails on one neighboring base station 120 identified in the Neighbor Information 300, the UE 102 can alternately attempt another retry on a different neighboring base station 120 identified in the Neighbor Information 300.

At block 512, the UE 102 can retry the call through an alternate access point 114 of an alternate network 106. For example, if the UE 102 finds an available Wi-Fi connection to a Wi-Fi access point, the UE 102 can retry the call via Wi-Fi calling techniques. As another example, the UE 102 can attempt to find a compatible base station of another provider's telecommunication network and accordingly place the call as allowed through a roaming arrangement with that provider, or as allowed through emergency call procedures if the call is an emergency call. In some examples, the UE 102 can reattempt the call one or more times through the same or different alternate access points if the first retry attempt fails.

Although FIG. 5 depicts a UE 102 retrying a call through a neighboring base station 120 of a second radio access layer 108 when Neighbor Information 300 includes information about that neighboring base station 120, in some examples the Neighbor Information 300 can also include information about other neighboring base stations 120 in a third radio access layer 108 and/or additional radio access layers 108. Accordingly, the UE 102 can be configured to retry the call through a neighboring base station 120 of a second radio access layer 108 identified in the Neighbor Information 300 at block 510, retry the call through a neighboring base station 120 of a third radio access layer 108 identified in the Neighbor Information 300 if the first retry also fails, and so on until attempts have been made on some or all of the different radio access layers 108 for which neighboring base stations 120 are present in the Neighbor Information 300, before moving to retrying the call on an alternate network at block 512. For example, a UE 102 can experience a failed call attempt on a PS domain 5G radio access layer 108, attempt a first retry on a PS domain LTE radio access layer 208A due to inclusion of a base station 212A of the PS domain LTE radio access layer 208A in the Neighbor Information 300, attempt a second retry on a CS domain radio access layer 208B due to inclusion of a base station 212B of the CS domain radio access layer 208B in the Neighbor Information 300 if the first retry fails, and finally attempt a third retry on an alternate network 106 if the second retry also fails. However, as noted above, if the Neighbor Information 300 does not include information about any neighboring base stations 120 of different radio access layers 108, the UE 102 can go straight to retrying the call on an alternate network 106.

CONCLUSION

As described above, a UE 102 can connect to a serving base station 118 of a first radio access layer 108. The serving base station 118 can transmit SIBs 116 that contain Neighbor Information 300 about neighboring base stations 120, if any neighboring base stations 120 are present that cover locations proximate to the serving base station 118. When an attempted call fails on the first radio access layer 108, the UE 102 can use the Neighbor Information 300 to determine how it should attempt a retry of that call.

If information about a neighboring base station 120 of a different radio access layer 108 is included in the Neighbor Information 300, the UE 102 can retry the call on the different radio access layer 108 through that neighboring base station 120. In some examples, the UE 102 can use the Neighbor Information 300 to directly connect to the neighboring base station 120 of the different radio access layer 108, thereby improving the overall call setup time by avoiding spending time searching for an available base station 112 of the different radio access layer 108.

If information about a neighboring base station 120 of a different radio access layer 108 is not included in the Neighbor Information 300, the UE 102 can retry the call on an alternate network 106. In this situation, because a base station 112 of a different radio access layer 108 is likely to be unavailable to the UE 102 at the UE's current location, the overall call setup time can be improved by skipping a search for a base station 112 of that different radio access layer 108.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of selecting a connection type for a retry of a failed call, comprising:
   receiving, by user equipment (UE), and prior to establishment of a call by the UE, one or more system information blocks (SIBs) from a serving base station of a first radio access layer of a telecommunication network;
   determining, by the UE, a call setup failure of the call that the UE attempted to place through the serving base station of the first radio access layer;
   determining a presence of information about neighboring base stations of a second radio access layer within neighbor information of the one or more SIBs, the information including at least a cell identifier of a neighboring base station, an indication of which radio access layer the neighboring base station is associated with, and information about frequencies and/or channels used by the neighboring base station;
   in response to determining the call setup failure of the call, selecting, by the UE, a retry connection type, wherein a connection to a neighboring base station of the second radio access layer is selected in response to determining that the presence of the information about the neighboring base stations of the second radio access layer is included in the neighbor information or a connection to an alternate network is selected in response to determining that the presence of the information about the neighboring base stations of the second radio access layer is not included in the neighbor information; and
   retrying, by the UE, the call through the retry connection type.

2. The method of claim 1, wherein the UE skips searching for an available base station of the second radio access layer when it selects the retry connection type as a connection to the alternate network.

3. The method of claim 1, wherein the call is an emergency call.

4. The method of claim 1, wherein the call is a voice call, the first radio access layer handles voice calls in a packet switched domain, and the second radio access layer handles voice calls in a circuit switched domain.

5. The method of claim 1, wherein the first radio access layer is a fifth generation (5G) radio access layer and the second radio access layer is a Long Term Evolution (LTE) radio access layer.

6. The method of claim 1, wherein the alternate network is a Wi-Fi network.

7. The method of claim 1, wherein the telecommunication network is operated by a first provider and the alternate network is a second telecommunication network operated by a second provider.

8. The method of claim 1, wherein the UE is unregistered on the second radio access layer prior to retrying the call through the second radio access layer.

9. The method of claim 1, wherein the connection to the alternate network comprises accessing a base station associated with a network provider that is different than a network provider associated with the UE and the call comprises a roaming call.

10. The method of claim 1, wherein the one or more SIBs include a first SIB and a second SIB, the first SIB being of a first type and the second SIB being of a second type that is different than the first type.

11. The method of claim 10, wherein at least one of the first type or the second type is associated with intra-frequency neighboring LTE base stations, inter-frequency neighboring LTE base stations, or CS domain radio access layers.

12. A user device, comprising:
    one or more processors;
    at least one radio interface; and
    memory storing computer-executable instructions that, when executed by the one or more processors, cause the one or more processors to perform operations comprising:
      receiving, through the at least one radio interface and prior to establishment of a call by the user device, one or more system information blocks (SIBs) from a serving base station of a first radio access layer of a telecommunication network;
      determining a call setup failure of the call that was attempted via the at least one radio interface through the serving base station of the first radio access layer;
      determining a presence of information about neighboring base stations of a second radio access layer within neighbor information of the one or more SIBs, the information including at least a cell identifier of a neighboring base station, an indication of which radio access layer the neighboring base station is associated with, and information about frequencies and/or channels used by the neighboring base station;
      in response to determining the call setup failure of the call, selecting a retry connection type, wherein a connection to an alternate network is selected in response to determining that the presence of the information about any neighboring base stations of the second radio access layer is not included in the neighbor information; and
      retrying the call, via the at least one radio interface, through the selected retry connection type.

13. The user device of claim 12, wherein the operations further comprise skipping a search for an available base station of the second radio access layer when the retry connection type is selected as a connection to the alternate network.

14. The user device of claim 12, wherein the call is an emergency call.

15. The user device of claim 12, wherein the call is a voice call, the first radio access layer handles voice calls in a packet switched domain, and the second radio access layer handles voice calls in a circuit switched domain.

16. The user device of claim 12, wherein the first radio access layer is a fifth generation (5G) radio access layer and the second radio access layer is a Long Term Evolution (LTE) radio access layer.

17. One or more non-transitory computer-readable media storing computer-executable instructions that, when executed by one or more processors, cause the one or more processors to perform operations comprising:
- receiving one or more system information blocks (SIBs) from a serving base station of a first radio access layer of a telecommunication network prior to establishment of a call;
- determining a call setup failure of the call that was attempted through the serving base station of the first radio access layer;
- determining a presence of information about neighboring base stations of a second radio access layer within neighbor information of the one or more SIBs, the information including at least a cell identifier of a neighboring base station, an indication of which radio access layer the neighboring base station is associated with, and information about frequencies and/or channels used by the neighboring base station;
- in response to determining the call setup failure of the call, selecting a retry connection type, wherein a connection to the neighboring base station of the second radio access layer is selected in response to determining that the presence of the information about the neighboring base stations of the second radio access layer is included in the neighbor information; and
- retrying the call through the selected retry connection type.

18. The computer-readable media of claim 17, wherein the call is an emergency call.

19. The computer-readable media of claim 17, wherein the call is a voice call, the first radio access layer handles voice calls in a packet switched domain, and the second radio access layer handles voice calls in a circuit switched domain.

20. The computer-readable media of claim 17, wherein the first radio access layer is a fifth generation (5G) radio access layer and the second radio access layer is a Long Term Evolution (LTE) radio access layer.

\* \* \* \* \*